US008495352B2

(12) United States Patent
Gupta et al.

(10) Patent No.: US 8,495,352 B2
(45) Date of Patent: Jul. 23, 2013

(54) SYSTEM AND METHOD FOR INSTANTIATION OF DISTRIBUTED APPLICATIONS FROM DISK SNAPSHOTS

(75) Inventors: Manish Gupta, New Delhi (IN); Pratik Gupta, Raleigh, NC (US); Narendran Sachindran, New Delhi (IN); Manish Sethi, New Delhi (IN); Manoj Soni, Rajsamand (IN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/963,260

(22) Filed: Dec. 8, 2010

(65) Prior Publication Data

US 2012/0151198 A1    Jun. 14, 2012

(51) Int. Cl.
*G06F 9/00* (2006.01)
*G06F 15/16* (2006.01)
*G06F 9/445* (2006.01)
*G06F 9/455* (2006.01)

(52) U.S. Cl.
USPC .............. 713/2; 713/1; 713/100; 709/220; 717/176; 718/1

(58) Field of Classification Search
USPC ........ 713/1, 2, 100; 709/220; 717/176; 718/1
See application file for complete search history.

(56) References Cited

U.S. PATENT DOCUMENTS

| 7,653,794 | B2 | 1/2010 | Michael et al. |
| 7,941,470 | B2* | 5/2011 | Le et al. ........................ 708/208 |
| 2006/0218544 | A1 | 9/2006 | Chakraborty et al. |
| 2006/0288168 | A1* | 12/2006 | Stevenson ..................... 711/115 |
| 2008/0250254 | A1 | 10/2008 | Bendapudi et al. |
| 2009/0172662 | A1 | 7/2009 | Liu |
| 2009/0228629 | A1 | 9/2009 | Gebhart et al. |
| 2009/0265706 | A1 | 10/2009 | Golosovker et al. |
| 2009/0328030 | A1* | 12/2009 | Fries ............................. 717/174 |
| 2012/0110574 | A1* | 5/2012 | Kumar ............................. 718/1 |

FOREIGN PATENT DOCUMENTS

JP    2006196014    7/2006

* cited by examiner

*Primary Examiner* — Stefan Stoynov
(74) *Attorney, Agent, or Firm* — Yudell Isidore Ng Russell PLLC

(57) ABSTRACT

A framework instantiates an application from its disk snapshots. The disk snapshots are taken from a different network environment and migrated to a virtualized environment. Modifications to operating systems and hypervisors are avoided, and no special network isolation support is required. The framework is extensible and plug-in based, allowing product experts to provide knowledge about discovering, updating, starting and stopping of software components. This knowledge base is compiled into a plan that executes various interleaved configuration discovery, updates and start tasks such that a required configuration model can be discovered with minimal start and update task execution. The plan generation automatically stitches together knowledge for the various products, thus significantly simplifying the knowledge specification. Once discovery is complete, the framework utilizes the discovered model to update stale network configurations across software stack and customize configurations beyond network settings.

17 Claims, 10 Drawing Sheets

SYSTEM AND METHOD FOR INSTANTIATION OF DISTRIBUTED APPLICATIONS FROM DISK SNAPSHOTS

BACKGROUND

1. Technical Field

The present disclosure relates generally data processing and more specifically to a method and system for instantiating a disk image of a software product from a different network environment to a virtualized environment.

2. Description of the Related Art

Corporations are motivated by several reasons to transition their physical data centers to a virtualized infrastructure. Physical data centers typically suffer from a problem of server sprawl where a large number of physical servers are used to host applications, with many servers being underutilized. Migrating these applications to a virtualized infrastructure allows for server consolidation and potentially significant cost reduction.

Migrating production applications from physical datacenters to a virtualized environment is becoming essential to reduce operational costs. In order to avoid direct access to production systems, migration from disk snapshots is preferable. Model-based migration approaches are not suitable for this purpose due to a need to perform configuration discovery on production systems. More recent approaches rely upon an isolated network for instantiating snapshots. These approaches require special setup and are limited to handling network configurations only.

Thus, while the reasons for transitioning to a virtualized infrastructure may be compelling, migrating composite enterprise applications from a running production environment is not straightforward. These applications tend to have a number of complex interdependencies across the software stack that will need to be captured and fixed-up during migration. For instance, an application server maintains a set of IP address, port, database name, username, and password in order to connect to a database. Thus migration requires discovery of application configurations on production systems, making it an intrusive process.

BRIEF SUMMARY

Disclosed are a method, a data processing system and a computer program product for instantiating disk snapshots from a different network environment to a virtualized environment. Product knowledge is used to orchestrate discovery, along with minimal configuration fix-ups and starting of components, in the migrated copy of the application. This use of product knowledge enables a framework to perform discovery in the presence of inconsistent network configurations. Once the discovery is complete and a configuration model is accessed, the framework allows the user to change non-network configurations and start the composite application.

In one embodiment, a computer implemented method is provided for instantiating disk snapshots from a different network environment to a virtualized environment. A product knowledge model is accessed. A disk snapshot is accessed of a composite application executing in a first environment as a plurality of virtual machines. The disk snapshot is migrated to a second environment. Network configuration settings are discovered using the product knowledge model. A configuration model is constructed based in part upon the discovered network configuration settings.

In another embodiment, a computer program product is provided for instantiating disk snapshots from a different network environment to a virtualized environment. A computer-readable medium stores sets of code. A first set of codes causes a computer to access a product knowledge model. A second set of codes causes the computer to access a disk snapshot of a composite application executing in a first environment as a plurality of virtual machines. A third set of codes causes the computer to migrate the disk snapshot to a second environment. A fourth set of codes causes the computer to discover network configuration settings using the product knowledge model. A fifth set of codes causes the computer to construct a configuration model based in part upon the discovered network configuration settings.

In additional embodiment, a system/apparatus is provided for instantiating disk snapshots from a different network environment to a virtualized environment. The apparatus comprises a processor executing a utility that causes the apparatus/processor to perform specific functions, including accessing a product knowledge model. The utility also performs the function of accessing a disk snapshot of a composite application executing in a first environment as a plurality of virtual machines. The utility performs the function of migrating the disk snapshot to a second environment. The utility further performs the function of discovering network configuration settings using the product knowledge model. The utility further performs the function of constructing a configuration model based in part upon the discovered network configuration settings.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present innovation will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
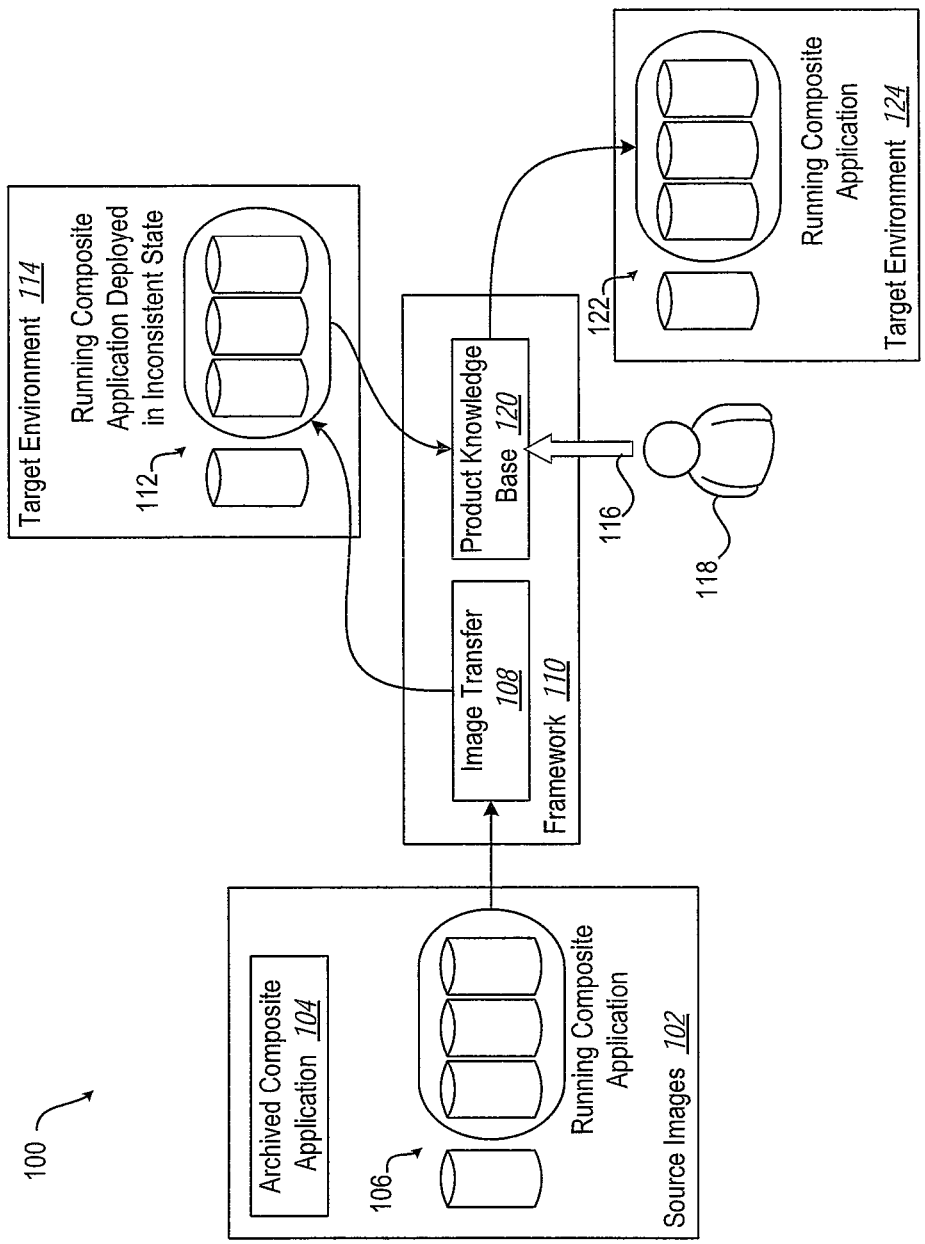
FIG. 1 presents an architecture of an exemplary framework, according to one embodiment.

In the present disclosure, a framework and approach are presented for migrating disk snapshots of composite applications to a virtualized, without the need for modifications to operating systems and hypervisors, or any special network isolation support. The embodiments are implemented within a framework for creating a virtual appliance from a set of machines running a properly configured application. The framework is extensible and plug-in based, allowing product experts to provide knowledge about discovering, updating, starting and stopping of software components. This knowledge base is compiled into a plan that executes various interleaved configuration discovery, updates and start tasks such that a required configuration model can be discovered with minimal start and update task execution. The plan generation automatically stitches together knowledge for the various products, thus significantly simplifying the knowledge specification. Once discovery is complete, the framework utilizes the discovered model to update stale network configurations across software stack and customize configurations beyond network settings.

In one embodiment, a product level knowledge base is built that can perform product discovery in the presence of inconsistent application configurations. Implementation of the embodiments described herein does not require any access to the original running application, and the described approach does not require any network isolation support or changes to operating systems. The configurations are updated using knowledge of the software stack installed in the snapshots.

By contrast, current technologies can deploy a distributed application from disk snapshots by retaining the current configurations and leveraging network isolation. Alternatively, network abstraction techniques can be used. Information Technology (IT) personnel prefer to use tools that do not access production systems, although IT personnel generally are willing to provide disk snapshots produced by regular backup tools. Thus, it is contemplated to migrate production applications without accessing productions systems apart from regular backup processes, deploying an application that was archived in the past. Therefore, application migration is enabled without directly accessing the production machines.

Virtualized migration is primarily motivated by benefits of the virtualized architecture. The migration does not typically involve changes to the software stack, and it can thus be performed using image based techniques. Also datacenters typically maintain regular backups using disk snapshot technologies. These snapshots can be used to drive image based migration and can remove the need to directly access production machines. However, disk snapshots pose a number of issues for migration into a virtualized. Firstly, the snapshots contain old network settings. Hence the migrated disk image cannot be booted up directly in the new environment. After the snapshots are prepared and booted, the application and middleware configurations will be in an inconsistent state. These configurations will have to be discovered and updated in order to start the application. Further, migration to a new environment typically requires changes of certain non-network configurations such as ports, passwords, etc. This requires additional capability to discover and propagate configuration changes.

In the following detailed description of exemplary embodiments of the invention, specific exemplary embodiments in which the innovation may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present innovation is defined by the appended claims and equivalents thereof.

Within the descriptions of the figures, similar elements are provided similar names and reference numerals as those of the previous figure(s). Where a later figure utilizes the element in a different context or with different functionality, the element can be provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components/devices/parameters herein, without limitation. Each term utilized herein is to be given its broadest interpretation given the context in which that terms is utilized.

As further described below, implementation of the functional features of the innovation is provided within processing devices/structures and involves use of a combination of hardware, firmware, as well as several software-level constructs (e.g., program code). The presented figures illustrate both hardware components and software components within example data processing systems and devices.

With reference to FIG. 1, a system 100 is depicted for instantiation of a distributed application from disk snapshots. Sources images 102 provide archived composite application 104 of a running composite application 106 to an image transfer component 108 of a framework 110. The framework 110 deploys a running composite application 112 in an inconsistent state to a first target environment 114. Product knowledge 116 supplied by a product expert 118 to a product knowledge base 120 addresses these inconsistencies to achieve a running composite application 122 in a second target environment 124, which can be the first target environment 114. Thereby, the framework 110 is not limited to creating a virtual appliance from a set of machines running a properly configured application.

It should be appreciated with the benefit of the present disclosure first that a framework performs configuration discovery in an inconsistent configuration environment. Second, the framework 110 provides an end-to-end approach for instantiating a composite application from disk snapshots. Third, the framework 110 can be extensible and plug-in based, allowing product experts 118 to provide knowledge about discovering, updating, starting and stopping of software components. Product knowledge is added to the knowledge base 116 once and is re-used across applications that use the product.

The product knowledge base 120 is compiled into a plan that executes various interleaved configuration discovery, updates and start tasks such that a required configuration model can be discovered with minimal start and update task execution. The plan generation automatically stitches together knowledge for the various products, thus significantly simplifying the knowledge specification. Once discovery is complete, the framework utilizes the discovered model to update stale network configurations across software stack and customize configurations.

Thus, the framework 110 for product level knowledge representation enables instantiating of a service containing inconsistent configurations and includes a task specification associated with an element or to a relation in a configuration meta-model. The example of tasks includes discovery, update, start, and stop. Task dependency specifications can define that task execution should precede another task in a given context. The framework 110 can discover and fix configurations and start the application components in part by creating a minimal set of start and update tasks that are required for execution of all discovery tasks. Implicit dependencies of a task on other discovery tasks are determined based on the task's input parameters and dependency specifications. A configuration model is generated using the knowledge base.

Figure 2:
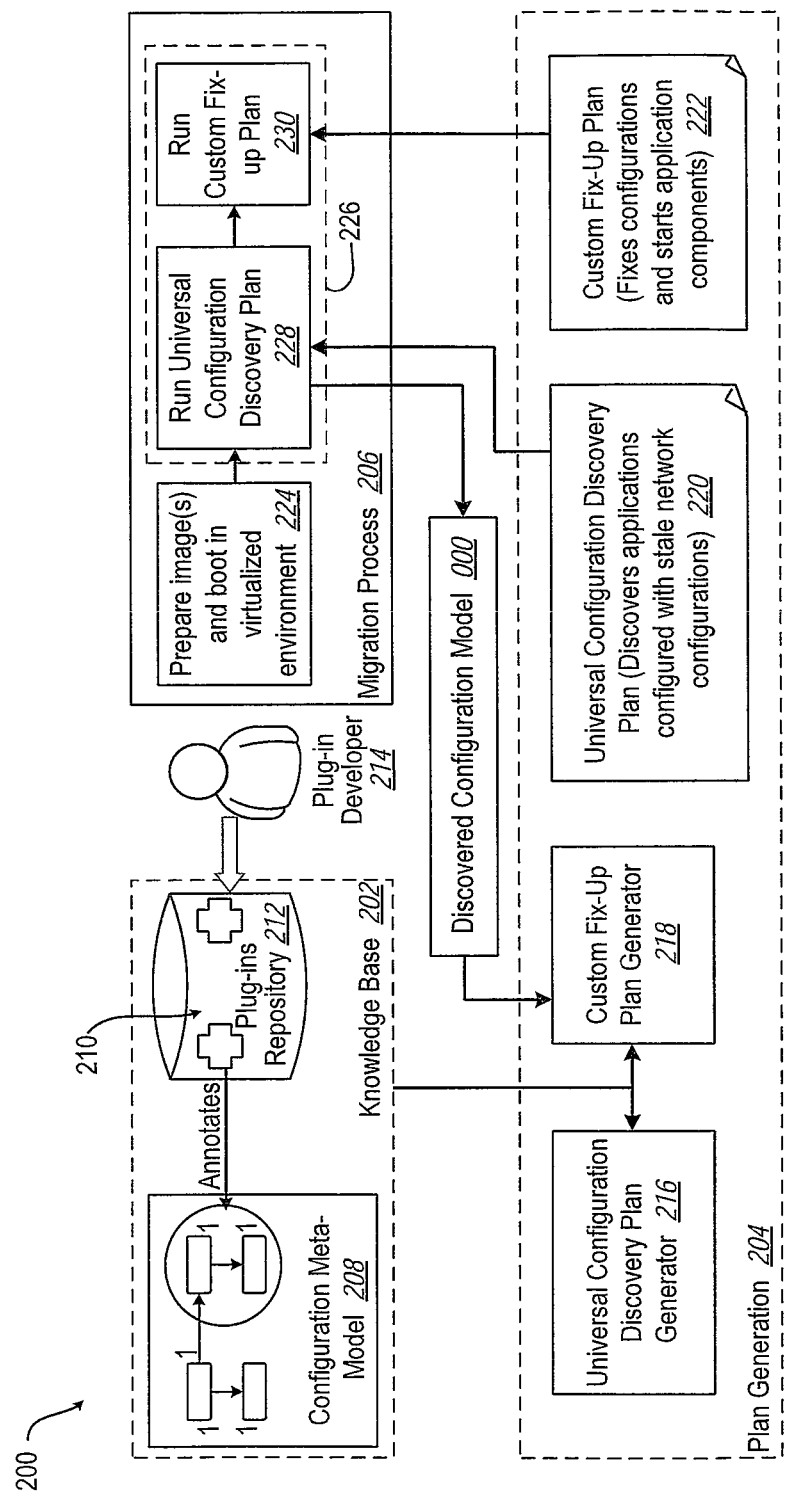
FIG. 2 shows an exemplary deployment topology the framework of FIG. 1, according to one embodiment.

In FIG. 2, an exemplary framework system ("framework") 200 implements the framework 110 (FIG. 1). The framework system 200 consists of a knowledge base 202, plan generation logic 204 and a migration process 206. The knowledge representation of the knowledge base 202 and the plan generation logic 204 for configuration discovery are a focus of this disclosure. The knowledge base 202 is composed of a configuration meta-model 208 and a set of plug-ins 210 stored in a repository 212. The meta-model 208 consists of element types which are groupings of related configurations, and relation types that denote the relationships between element types.

A plug-in 210 describes the knowledge about one or more element types and relation types defined in the meta-model 208. This knowledge is primarily about performing configuration discovery, configuration update and start/stop of components of the associated element types.

The plug-ins 210 are typically developed by the corresponding configuration experts (plug-in developer) 214. While an implemented prototype uses a custom meta-model, the plug-ins 210 can be easily ported to a standard meta-model such as IBM's Common Data Model. In exemplary framework system 200, an expert 214 can develop a plug-in 210 by leveraging existing scripts and bundling the scripts with a few descriptors. The descriptors are specified in the terms of the meta-model, hence, a plug-in writer can develop a plug-in in isolation, without being aware of the content of other plug-ins.

Plan generation logic 204 includes a universal configuration discovery plan generator 216, a custom fix-up plan generator 218, a universal configuration discovery plan 220 and a custom fix-up plan 222. Given a set of plug-ins 210 in the knowledge base 202, the framework system 200 generates the universal configuration discovery plan 220 that can orchestrate the discovery of a solution running with inconsistent configurations. The scope of discovery is bounded by the configurations managed by the plug-ins 210 in the knowledge base 202. The discovery process is designed to execute in an inconsistent configuration environment. It is also equipped for updating and starting a minimal set of application components required for discovery.

Based on the discovery results, the framework system 200 generates the custom fix-up plan 222 for the solution. This custom fix-up plan 222 identifies the configurations that can further be modified in the new environment (e.g. ports, passwords) and contains the logic to update these configurations along with remaining stale network configurations across the software stack.

The migration process 206 consists of steps that are performed on disk snapshots of a composite solution in order to migrate the solution to a virtualized environment. A first component 224 prepares image(s) and boots up in the virtualized environment. In particular for booting the snapshots, the process first creates virtual snapshot disks from production disk snapshots using a Physical-to-Virtual (P2V) tool. The virtual disks are then prepared for booting by injecting network fix-up scripts. These scripts are invoked during first boot before network services start and they update the network configuration of the machine as per new environment.

An agent is also copied into these images. The agent is capable of performing basic operations (e.g., running commands, reading/writing files, etc.) and is used by the framework system 200 for various tasks involved in migration. Once the disks are prepared, the disks are booted up in the target environment and assigned new network settings. The network settings are made available through a virtual floppy disk. The boot scripts inside the machines read the virtual floppy contents and use the new network settings to re-configure the network adapters. Additionally, the scripts start the agent in each of the machines.

Then, the migration process 206 performs configuration discovery as depicted at 226. After the machines boot up, the framework system 200 performs a second component 228 for discovery of the application installed on the machines. The universal configuration discovery plan 220 generated from the knowledge base 202 drives the discovery. At the end of the discovery phase, the framework system 200 constructs a configuration model.

Then a third component 230 runs the custom fix-up plan 222 to update the stale network settings across software stack. For configurations, beyond network settings, a dynamic user interface is generated to gather new configuration information from the user. The user provided input is then used to reconfigure the application for the new environment.

In the following sections, aspects of the framework are described that are responsible for carrying out the configuration discovery.

Figure 3:
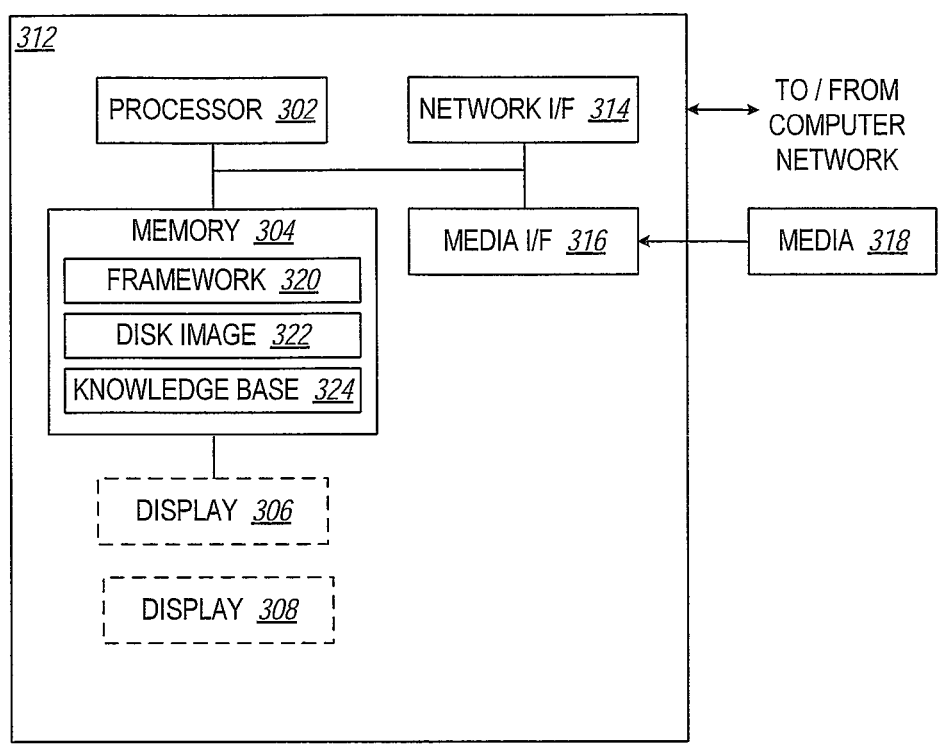
FIG. 3 depicts a computer system that may be useful in implementing one or more aspects and/or elements of the described embodiments.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with storage media 318.

Examples of a tangible computer-readable storage medium include a semiconductor or solid-state memory (for example memory 304), magnetic tape, a removable computer diskette (for example media 318), a random access memory (RAM), a read-only memory (ROM), a rigid magnetic disk and an optical disk. Current examples of optical disks include compact disk-read only memory (CD-ROM), compact disk-read/write (CD-R/W) and DVD. Alternate media can include an electronic, magnetic, optical, electromagnetic, infrared, or semiconductor system (or apparatus or device) or a tangible propagation medium.

A system, preferably a data processing system, suitable for storing and/or executing program code will include at least one processor 302 coupled directly or indirectly to memory elements 304 through a system bus 310. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

The memory 304 contains a framework utility 320 for accessing a disk snapshot 322 of a composite application that executes on a different network (first environment) as a plurality of virtual machines. The framework utility 320 also accesses a product knowledge model 324. The processor 302 executes the framework utility 320 to migrate the disk snapshot to a target (second) environment (not shown) via the network interface 314. Via the network interface 314, the framework utility 320 discovers network configuration settings using the product knowledge model 324. Thereby, the framework utility 320 constructs a configuration model based in part upon the discovered network configuration settings.

Embodiments of the present innovative approach for automating virtual appliance construction are focused at least in part upon (1) specifying additional knowledge on top of a pre-defined structural meta-model of configurations and (2) overall system architecture and process for constructing and deploying a virtual appliance using the above knowledge. The knowledge representation was primarily limited to specification of (a) independent attributes, which are attributes of component types in the configuration meta-model that can be offered for modification during deployment, (b) dependent attributes, which are attributes of component types in the configuration meta-model whose value depends on one of the independent attributes, and (c) configuration publishers, which represent script descriptors that are associated with one of the component types in the meta-model.

In the presented embodiments, it was assumed that the application components are already installed, configured and started up on a set of virtual machines in a development environment and a structural configuration model is obtained by running a configuration discovery tool. After discovery, a copy of disk images of the virtual machines is packaged along with the configuration model. During deployment of the virtual appliance, the user first specifies new values for the independent attributes in the configuration model. Second, the specification of dependent attributes is processed to derive their new values based on user supplied values. Third, new virtual machines are created and booted with new network settings. Finally, the configuration publisher specification is used for executing relevant scripts with correct environment and parameter values for fixing the configurations in the virtual machines.

End-to-End Approach

Figure 4:
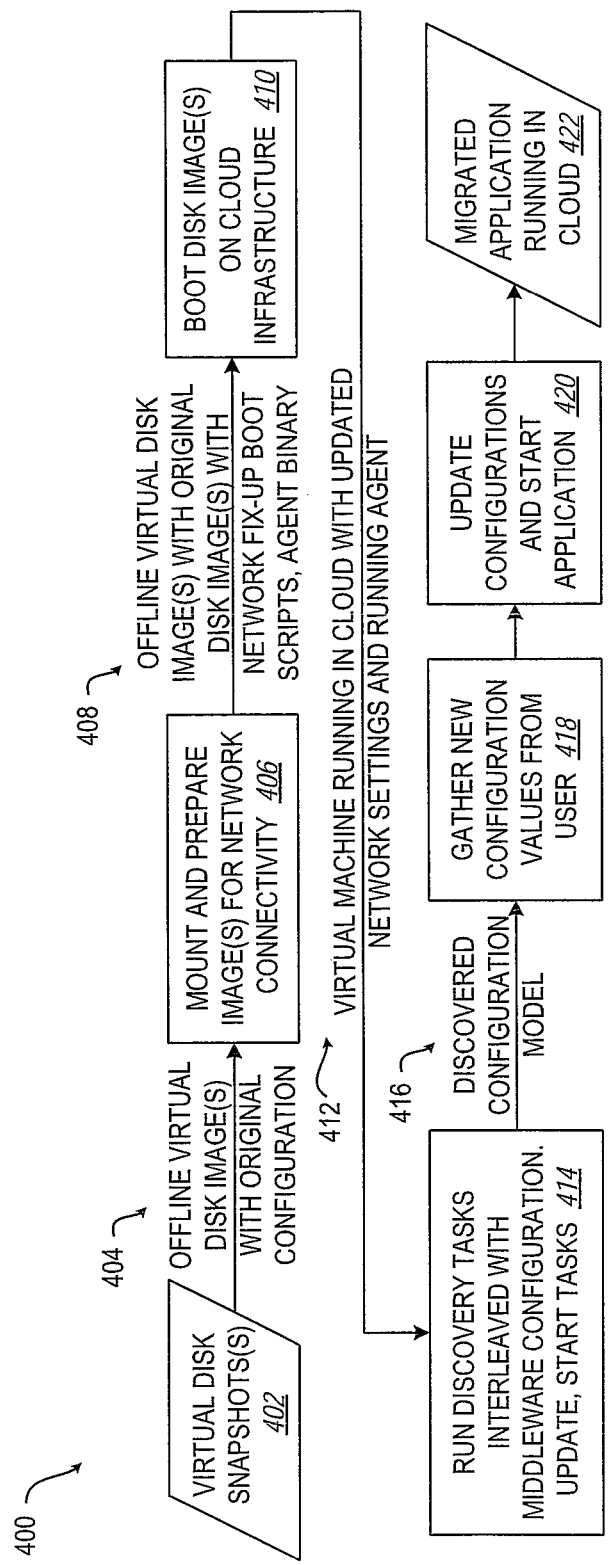
FIG. 4 depicts a flow diagram of an end-to-end approach to disk image based migration, according to one embodiment.

With reference to FIG. 4, an end-to-end approach is presented for preparing a production composite solution for virtualized on-boarding takes as input a set of virtual disks of a production system. These disks can be created from production snapshots using a Physical-to-Virtual (P2V) tool. However, depending on the application, the production environment may need to be brought down for a short window during which the migration will be performed.

In FIG. 4, an end-to-end methodology 400 is depicted. Virtual disk snapshots 402 are used an input comprising offline virtual disk image(s) with original configuration, as depicted at 404, to a procedure for mounting and preparing image(s) for network connectivity (block 406). The result depicted at 408 comprises offline virtual disk image(s) with original disk image(s), which includes network fix-up boot scripts, agent binary. Book disk image(s) are then provided on the virtualized infrastructure (block 410). As depicted at 412, this results in a virtual machine running in virtualized infrastructure with updated network settings and running agent. Discovery tasks are run interleaved with middleware configuration, update and start tasks (block 414). The result, as depicted at 416, is a discovered configuration model. New configuration values are gathered from a user (block 418). Configurations are updated and the application is started (block 420), resulting in the application being migrated and running in the virtualized infrastructure (block 422). Aspects of this end-to-end methodology 400 are discussed in greater detail as follows.

Knowledge Representation

According to one or more embodiments, the core of the framework consists of an extensible plug-in based knowledge base. This knowledge base consists of all the knowledge required to reconfigure a composite application during virtualized migration, including knowledge about configuration discovery, configuration updates, and starting of software components. In the various embodiments, the configuration space that is required to be handled is a very small subset of the total configuration space, since an image based migration approach is used.

In one embodiment, within the framework, the knowledge is specified on top of a structural configuration meta-model (e.g. a common data model of International Business Machines). The elements in the configuration meta-model are referred to as component types and as configurations to the element attributes. In one embodiment, the framework is neutral to the names used for component types, configurations and relations. However, according to one embodiment, the names used in the knowledge representation should match those defined in the meta-model.

A plug-in specifies all actions of the plug-in in the form of task specifications. Each task specification is associated with a single component type and consists of one or more operations that execute on a target machine. In the presented embodiments, the framework currently allows the specification of four task-types: discovery, update, start and stop. There can only be at most one task specification of each task-type associated with a given component type, in one embodiment.

A task specification can describe its parameters in terms of one or more configurations from the meta model. These parameters are specified in terms of a path in the configuration meta-model. This path is relative to the component type associated with the task specification, and the path is similar to an XPath. An implicit implication of the input parameter specification is that a task can be executed only after all the input parameters are available in the configuration model, in one embodiment.

In one embodiment of the present disclosure, a path is represented by the relation names visited by the path separated by a '/'. Further, the relation names are optionally annotated with the visited component type. In order to represent a path that ends at an attribute instead of a component type, the name of the attribute is appended, prefixed with an '@'. For example, a path represented as 'B[T1]/C' in context of a component type A means that the path starts from an component type A and it follows relation B to reach to another component type T1 and from there it follows the relation C to finally reach to a desired component type. Similarly, a path 'B/C[T2]/@D' ends at attribute D of component type T2.

A task specification also describes executables such as commands and scripts. On completion, a task specification can also add objects to the configuration model. These objects are only allowed to be instances of the component type associated with the task specification. Task specifications are also allowed to specify conditional dependencies amongst themselves. A dependency is specified as a <meta-model path, task-type> tuple. As with parameters, conditions are also specified in terms of a meta-model path.

Task specifications are consumed by the framework during migration and instantiated as tasks to be executed on target machines. The different task types supported by the framework are described below.

Discovery tasks: Discovery tasks are responsible for discovering software components, configurations and relations in a target machine. In one implementation, discovery tasks are only allowed to depend in start tasks. This ensures that a discovery task runs only when components that it needs to be in started state, if any, are started correctly before it is invoked. Discovery tasks typically enhance the configuration model by adding objects and relations. A discovery task does not modify the configuration model if a component or relation of the associated type is not found in the solution.

In one embodiment, the framework also allows a special type of discovery task, a split-phase discovery task. The use of the split-phase discovery task allows for cases where components need to be discovered partially, started using the partially discovered information, and then discovered in its entirety. For example, a database instance location and name may need to be discovered first, and the instance is started before further instance specific details (ports, database names, etc.) can be queried from the instance.

Update Tasks: Update tasks are responsible for updating configurations of a software component. Similar to discovery tasks, update tasks are only allowed to depend on start tasks, in one embodiment. These dependencies ensure that all components that need to be queried for configurations are running before the task is executed. As with discovery, update tasks can be split into two phases.

In one embodiment, the input parameter specification in both discovery and update tasks can explicitly specify whether the parameter value should be old or new. The old value refers to the configuration value in the source environment and the new value refers to the value in a new environment. In case of an update task, typically, the splitting feature helps if update commands utilized in the update task specification require both old and new values. For instance, in order to make a change in the /etc/hosts file, an update task can replace old values to new only if both sets of values are passed to the update task. Similarly, password update tasks usually require both the old and new values, in one or more embodiments. In case of a discovery task, the old values are used to correlate the configurations found in the system, while the new values are needed to connect to the running system components.

Start tasks: Start tasks are responsible for starting software components. Start tasks are allowed to depend on other start tasks and update tasks. The start dependencies are required to start application components in the right order. The update dependencies are required in certain cases where configurations of other components need to be updated before a component can be started. For instance, a database start may depend on a listener configuration being updated. The assumption is that a minimal set of update dependencies are specified, which allows the software component to be started for configuration discovery and updates. The software component may be not be in usable state from an application point of view Stop tasks: Stop tasks are responsible for stopping a software component. Stop tasks are only allowed to depend on other stop tasks, in one embodiment.

Task Execution Plan

The process for compiling task specifications into an executable plan is now described, according to one or more embodiments. The run-time is also described for task execution. In the generated plan, each discovery task specification is translated into one discovery task that is responsible for populating the configuration model with components or relations of the type that the specification is associated with. A few start and update task specifications are also utilized, each for creating one or more tasks into the plan. Not all start and update task specifications are utilized since one of the objectives is to keep the execution of start and update tasks to a minimum. In other words, only those start and update tasks that are essential for discovery are executed. One reason for limiting start and update tasks is that, typically, start tasks are time consuming. Plan Generation: In one embodiment, for plan generation, a graph is created where nodes represent tasks and edges represent the dependencies among the tasks. Dependencies among tasks can be implicit or explicit.

Implicit Dependencies: During task execution, a few paths are evaluated, each in context of a component in the configuration model. Thus, before a task is executed, the configuration model should be sufficiently discovered to contain all the components and relations of the types that the paths visit. This requirement is translated into an implicit dependency of a task on one or more discovery tasks. For instance, if a task A uses a path R1[T1]/R2[T2] as one of its input parameters, the task A implicitly depends on discovery tasks associated with relations R1, R2 and types T1, T2.

Explicit Dependencies are dependencies explicitly defined in a task specification. In one or more embodiments, the following explicit dependencies discovery task are considered:

start tasks, start task→update tasks, and update task→start tasks.

Dependency of start tasks are not considered on other start tasks since, during discovery phase, software components need not be started in proper order from an application point of view.

An initial graph is constructed by creating a discovery task node for each discovery task specification. Edges are created among discovery tasks for implicit dependencies based on input parameters defined in their task specifications. In order to add nodes and edges for explicit start dependencies, iteration is performed through the graph. For each discovery task node D, the node's explicit start dependencies are determined from the corresponding task specification. For each such dependency, a new node N is added in the graph. N represents a start task associated with a component type that the dependency path P specified in D's task specification leads to. N is annotated with P. Finally, the implicit dependencies of N are added based on the input parameter paths, the dependency path P, and are added to the discovery task associated with N's component type. Following, to add explicit dependencies for each N, the above procedure is repeated, except that for each new node N', the annotation is pre-pended by the annotation of N. This process is repeated until all the explicit dependencies are handled.

In the final dependency graph there is one node for each discovery task specification. Start and update tasks do not appear if no discovery task depends on them. Also, start and update task are annotated to be executed conditionally, in order to minimize the update and start tasks.

In the embodiment in which split phase discovery and update task specifications are handled, each such task in the dependency graph is broken into three tasks, phase I, phase II, and start task. The phase II task is made dependent on the start task, and the start task is in turn made dependent on the phase I task. All other tasks dependent on the split phase tasks are made dependent on the phase II task. Further, in order to generate an executable workflow from this dependency graph, the embodiment employs one of the regular plan generation techniques, such as a graph sorting algorithm.

In one embodiment, the task execution run-time carries out the execution of individual tasks during execution of the generated workflow. For executing a discovery task associated with component type D, an ordered set of paths P={P1, , Pn} is provided as the input parameter specification, in one implementation. With the described implementation, Pi is represented as Ri[Ti]/Xi. Thus, Ri[Ti] is the first segment in the Pi and Xi is the remaining path. In paths P, it may be possible that Ri[Ti]=Rj[Tj] and Xi, Xj. The run-time computes a set of component types T={Ti:Pi=Ri[Ti]/Xi, Pi. P}. In one or more embodiments, T may be smaller than P. In the configuration model, for each set t={ti: ti is only instance of type Ti in this set, Ti. T}, the run-time computes an ordered set v={vi=evaluate Xi on tj:tj. t, tj is of type Ti}. This ordered set contains the input parameter values for the task. The run-time invokes the task with these input parameters, and the task returns a set Dret={d1, , dm}, where di is of type D. For each d.Dret, the runtime adds an instance of relation Ri, between d and tj where tj. t, tj is of type Ti,.Pi=Ri[Ti]/X, Pi. P. In addition, if the discovery task is a phase-II task, the run-time invokes the task for each component returned by phase-I of the task. In this case, the runtime passes the component returned by the phase I along with the same parameter values that were used in the phase I. The phase II task populates the remaining attributes of the component.

There is a slight variation in how the run-time executes a discovery task that is associated with a relation type in the configuration meta-model. In this case, the set T and t always contains exactly two entries. For instance, a t={tsource, ttarget} contains the potential source and target of the relation. Moreover, the task returns a boolean value instead of Dret and the run-time creates the relation between tsource and ttarget if and only if the boolean value is true.

With the above example, in order to execute a start or an update task associated with component type D, an ordered set of paths P={P1, , Pn} is provided as the input parameter specification. As described herein, these tasks are annotated with a path, such as P'=R'[T']/X'. For each component of type T', the run-time evaluates X', which produces zero or more components of type D. In the latter case, as in the case of a discovery task, the runtime evaluates P on the component for computing the input parameters, and the runtime invokes the task with the input parameters.

Figure 5:
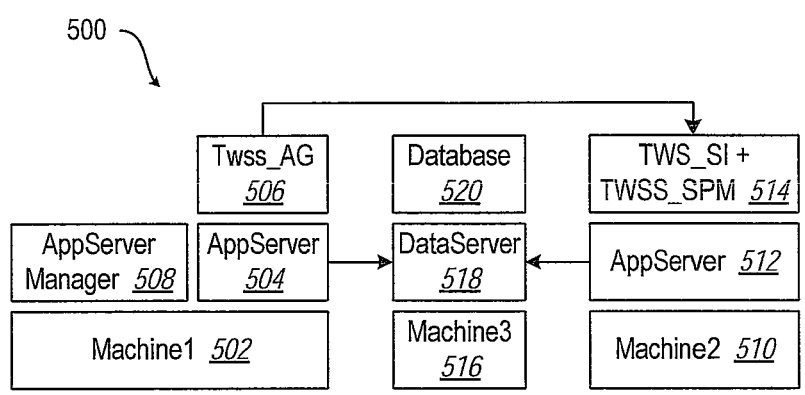
FIG. 5 depicts a block diagram of an illustrative telecom application deployment, in accordance with one embodiment.

FIG. 5 provides an example of a real world composite application utilizing the embodiments described herein. In the example, a telecom web services application is utilized for evaluating the effectiveness of the disclosed virtualized migration framework. The application runs on a Telecom Web Services Server (TWSS) and exposes high-level Web service interfaces to network services for third parties. TWSS has three main components: (1) Telecom Web Services Access Gateway, which provides policy-driven request routing and traffic monitoring, authorization, and management capabilities; (2) Service Policy Manager, which provides management, storage, and retrieval functions for the policy configuration data, and the runtime data used to customize service delivery for a given requester; and (3) Web service implementations, which may be one or more service implementation components that provide pre-built connections to telecom networks.

In FIG. 5, a TWSS deployment topology 500 is depicted as a metal-model consisting of three machines, where relation discovery task are provided only for relations annotated as dotted lines. The first machine, Machine 1 502 contains an Application Server 504 that hosts the Enterprise Service Bus (ESB), which in turn hosts multiple Service Component Architecture (SCA) modules. In this scenario, the SCA Module of interest is the Access Gateway (AG) component 506 of TWSS. The Machine 1 502 also contains an Application Server Manager 508. The second machine, Machine 2 510 contains another Application Server 512. This Application Server 512 hosts two other two TWSS components, namely Service Policy Manager (SPM) and a Service Implementation (SI) 514. The third machine, Machine 3 516 contains a Data Server 518 that hosts a relational database 520 that stores application configuration data, monitoring data and policies. One of the configurations stored in the database 520 is used by AG 506 to locate SI 514.

The arrows in FIG. 5 represent application level dependencies. Each of these dependencies further depends on resolution of a number of other middleware and system level dependencies. For example, AG 506 stores the location of an SI 514 in the database 520. This database 520 is accessed via a data source configured on the application server 504. Further, the data source stores database connectivity information such as IP Address, port etc. In order for AG 506 to be able to locate SI 514, the database 520 needs to be accessible externally. This access is possible only if the database 520 is already running, which in turn requires that the database configurations be consistent with the machine settings.

Figure 6:
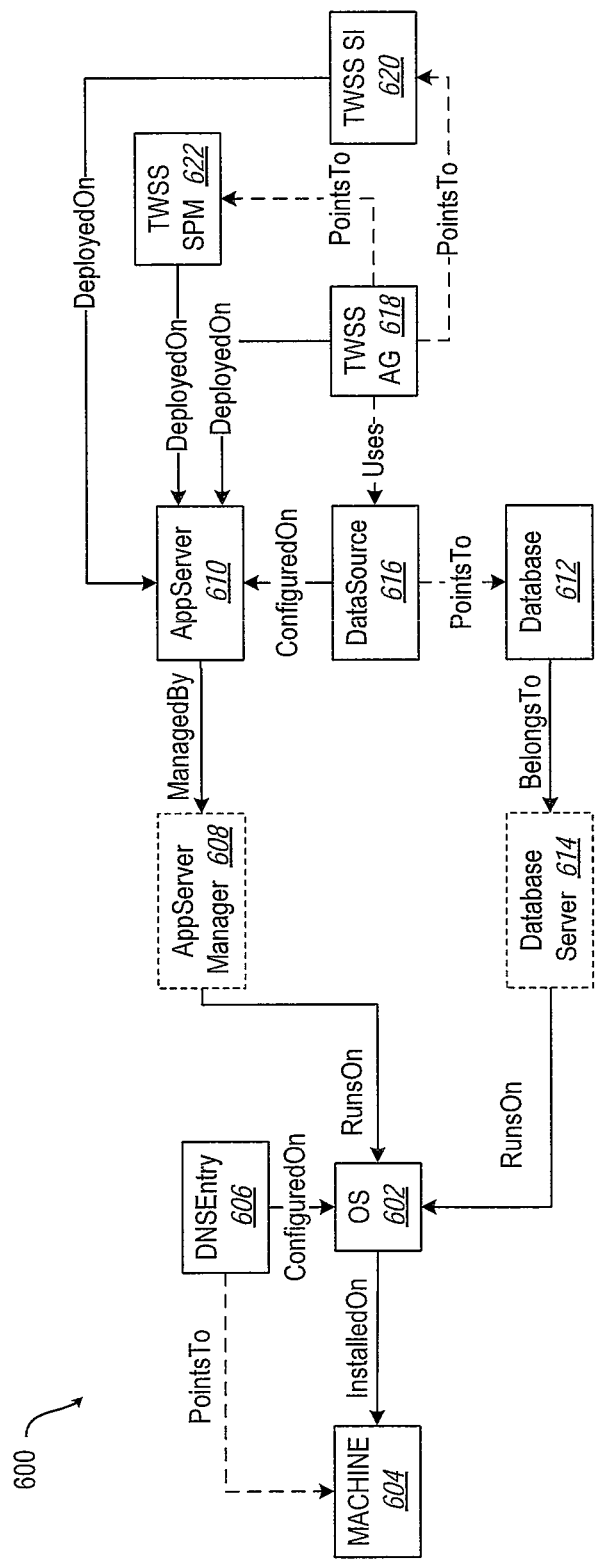
FIG. 6 depicts a block diagram of a meta-model for a few component types in the an example application.

FIG. 6 depicts a configuration meta-model 600 for the component types and relations used by the telecom application presented here. An operating system (OS) 602 is installed on a Machine 604. A Domain Name Server (DNS) entry 606 is configured on the OS 602 and points to machine 604. An AppServer Manager 608 runs on the OS 602 and manages an AppServer 610. A database 612 belongs to a Database Server 614 that runs on the OS 602. A Data Source 616 is configured on the AppServer 610 and points to the Database 612. A TWSS AG 618 uses the Data Source 616, points to a TWSS SI 620 and a TWSS SPM 622, and is deployed on the AppServer 610. The TWSS SI 620 and TWSS SPM 622 are also deployed on the AppServer 610.

Figure 7:
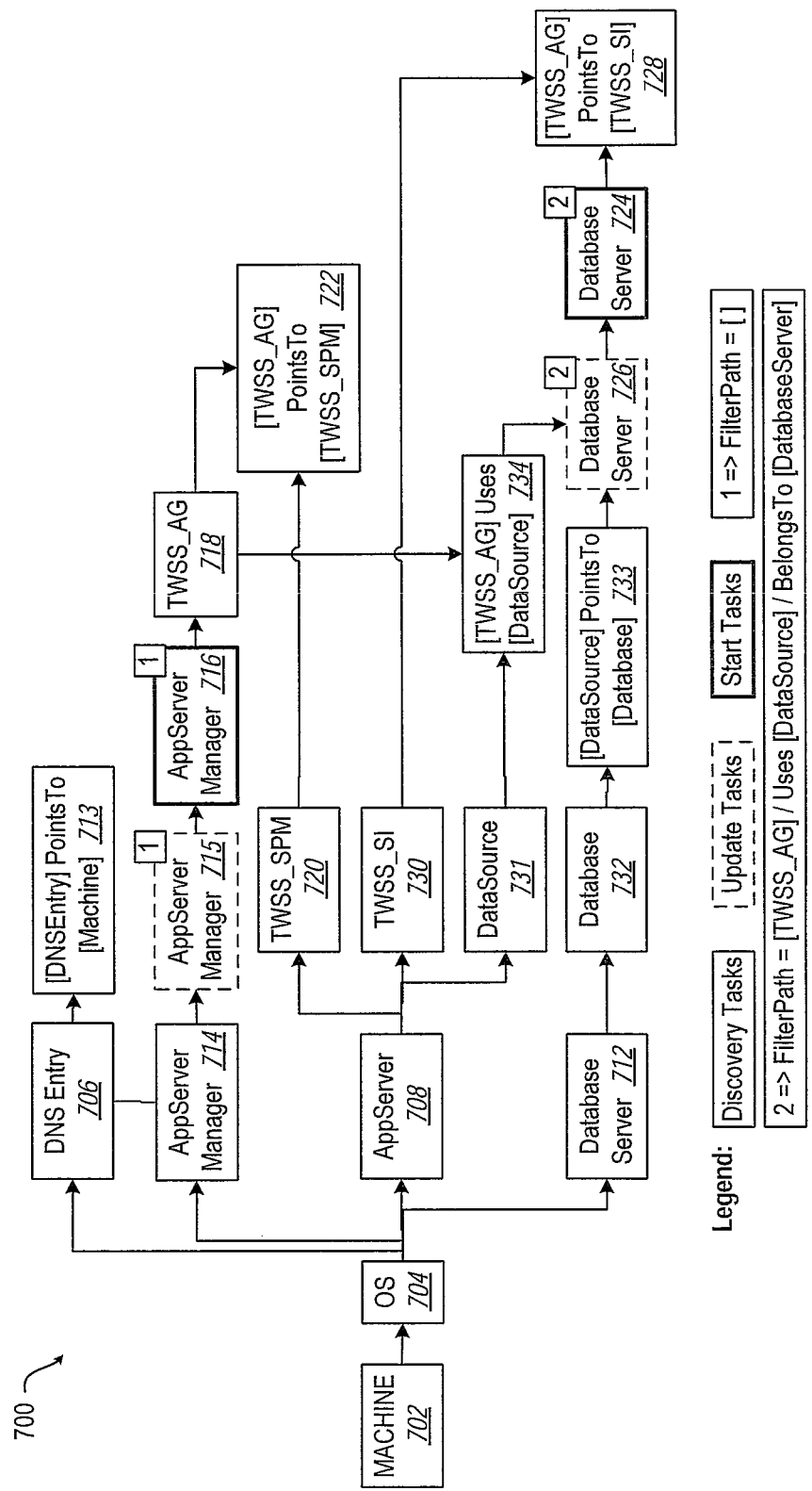
FIG. 7 depicts a block diagram of a plan generated based on the meta-model in FIG. 6, according to one embodiment.

FIG. 7 shows a type-level plan 700 that the framework generates for discovering all components in the TWSS application. The plan 700 is generated based on the meta-model in FIG. 6. An edge between two tasks shows the execution time dependency computed based on implicit and explicit dependencies in the tasks specifications. Filter path is provided for an update and start task filters out the components that need to be updated or started in a given set-up. Solid boxes denote discovery tasks, the dotted boxes denote update tasks and the grey boxes denote start tasks. All edges in the plan graph denote a predecessor-successor relationship.

After discovering machine 702 and OS components of the OS 704, the plan 700 parallelizes multiple independent discoveries to obtain information about local DNS entries 706, application servers 708, server managers 710 and database servers 712 that are installed on the machines 702. The DNS entry 706 provides discovery of the machine 713. As the discovery is performed, the in-memory topology maintained by the framework is continuously updated with components and configurations. As described earlier, each task in the plan 700 is instantiated (potentially multiple times) based on the components discovered by all its predecessor tasks.

In the next phase, the plan 700 discovers applications running on the application servers 708 and databases residing in the discovered database servers 712. In one embodiment, AG application discovery requires the corresponding manager server 714 to be running already in order to run specific manager queries. The manager server 714 in turn requires network configuration updates in certain files in order to start properly. These dependencies are reflected in the plan with manager server update 715 and start task 716 preceding AG discovery 718. Further, as shown, the filter paths associated with the manager server update 715 and start tasks 716 are empty, and update and start tasks need to be executed for all the manager servers in order to discover all AG(s) in a given solution. In particular, the filter paths are depicted as AppServer 708 depicted as passing to TWSS SPM 720 to AG to SPM relationship creation 722.

Similarly, locating the service implementation (SI) for an AG requires querying a database table for the SI IP address and port details. In one or more embodiments, the locating of the SI requires the database to be running already, which in turn requires that the database network configurations be up to date in the new environment. The plan handles this by scheduling the database server start 724 and database server configuration update 726 before the AG to SI relationship creation 728. Finding the correct database to update and start (as shown in the associated filter path 730-733) requires discovering the database being used by AG 734. Hence the database update task 726 is preceded by the AG to application server data source relationship discovery, which in turn requires discovering all application server data sources, in one embodiment. Additionally the discovered data sources need to be linked to their databases, and these links are reflected in the dependency of the database update on the discovery of data source to database relationships. In one embodiment, other dependencies captured by the plan include precedence of DNS entries before their relationships to machines are created, and the precedence of SPM, AG discovery over the AG-SPM relationship discovery task.

In summary, the case study highlights that the disclosed approach does not require any special setup unlike network isolation techniques. Further, the framework is capable of performing discovery in the presence of inconsistent configurations, and thus is suitable for migrating from disk snapshots.

The plan graph 700 demonstrates that the framework seamlessly interleaves discovery, update and start tasks in order to achieve a correct sequence that will allow for discovery of all components. The framework provides a base for integration of knowledge provided by multiple product experts. It is appreciated that building a plan such as this manually is a very complex, cumbersome and error-prone process. In the one or more embodiments presented, the framework limits knowledge definition to a product and its interactions, and automates the orchestration of numerous tasks required in making an application consistent in a new environment.

Figure 8:
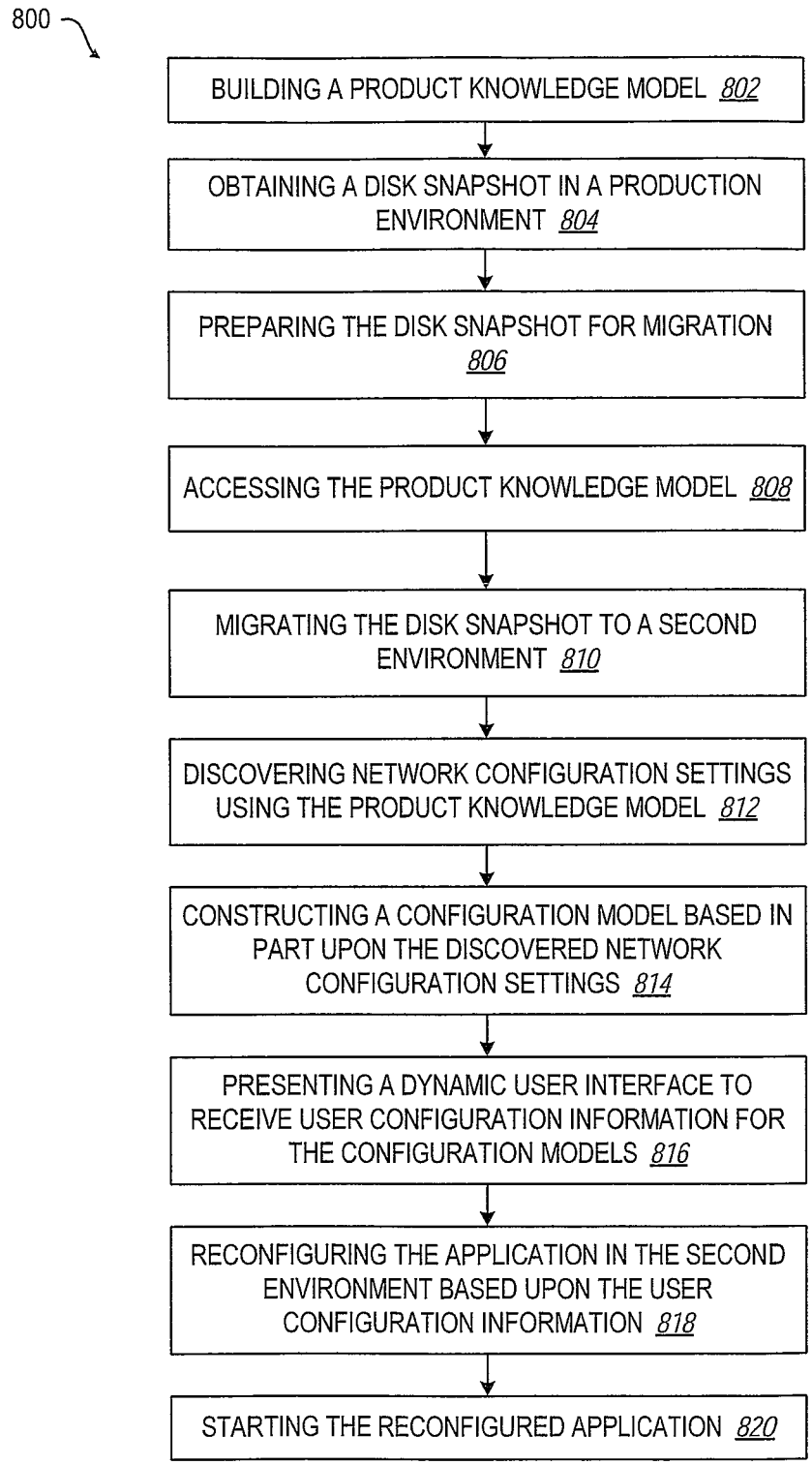
FIG. 8 depicts a flow diagram for a methodology for instantiating disk snapshots from a different network environment to a virtualized environment, according to one or more embodiments.

In FIG. 8, a methodology 800 is depicted for instantiating disk snapshots from a different network environment to a virtualized environment. A product knowledge model is built (block 802). In one aspect, the product knowledge model is built as a framework of a structural configuration meta-model of component types of selected configurations. Knowledge is specified on top of the framework as task specifications, and each specification comprises actions selected from a group consisting of discovery, update, start and stop, taken on a selected component type.

A disk snapshot is accessed of a composite application executing in a first environment as a plurality of virtual machines (block 804). The disk snapshot is prepared for migration to a second (target or virtualized) environment (block 806). The product knowledge model (e.g., plug-in) is accessed (block 808). The prepared disk snapshot is migrated to the second environment (block 810). Network configuration settings are discovered using the product knowledge model (block 812). A configuration model is constructed based in part upon the discovered network configuration settings (block 814). A dynamic user interface is presented to receive user configuration information for the configuration model (block 816). Based upon user configuration information, the application is reconfigured in the second environment (block 818). The reconfigured application is then started in the second (target or virtualized) environment (block 820).

Figure 9:
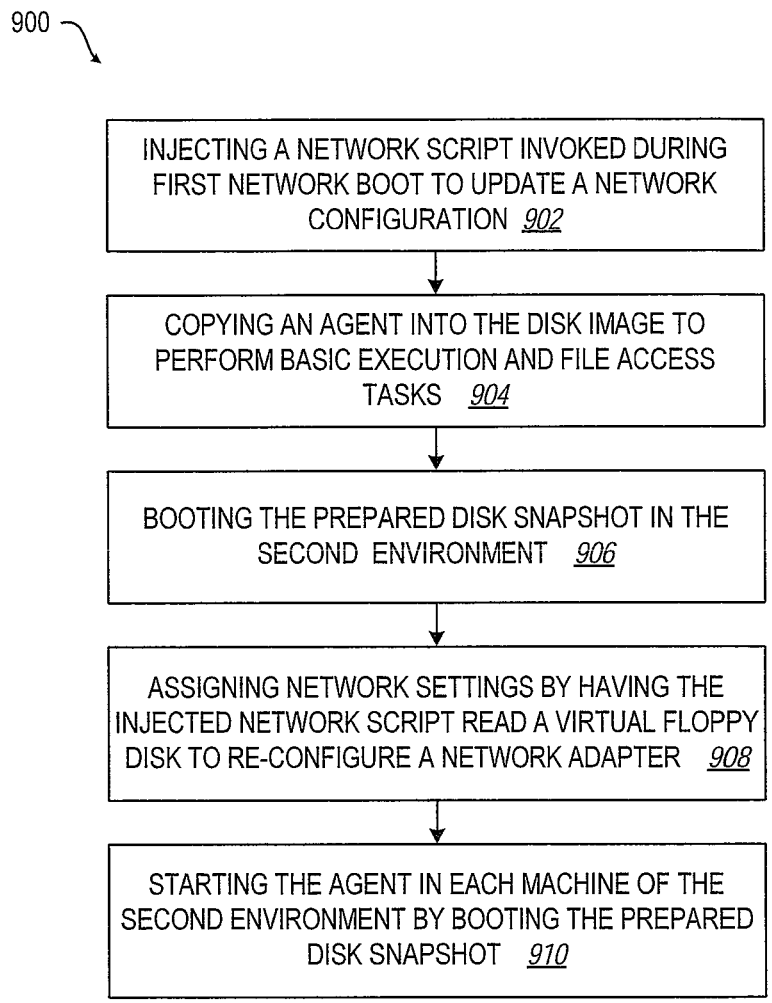
FIG. 9 depicts a flow diagram for preparing the disk images for migrating to the target environment for the methodology of FIG. 8, according to one or more embodiments.

In FIG. 9, a methodology 900 is depicted for preparing the disk images for migrating to the target environment, such as depicted in block 806 of FIG. 8. The disk image is prepared for migration by injecting a network script invoked during first network boot to update a network configuration (block 902). An agent is copied into the disk image to perform basic execution and file access tasks (block 904. The prepared disk snapshot is booted in the second environment (block 906). Network settings are assigned by having the injected network script read a virtual floppy disk to re-configure a network adapter (block 908). The agent is started in each machine of the second environment when the prepared disk snapshot is booted (block 910).

Figure 10:
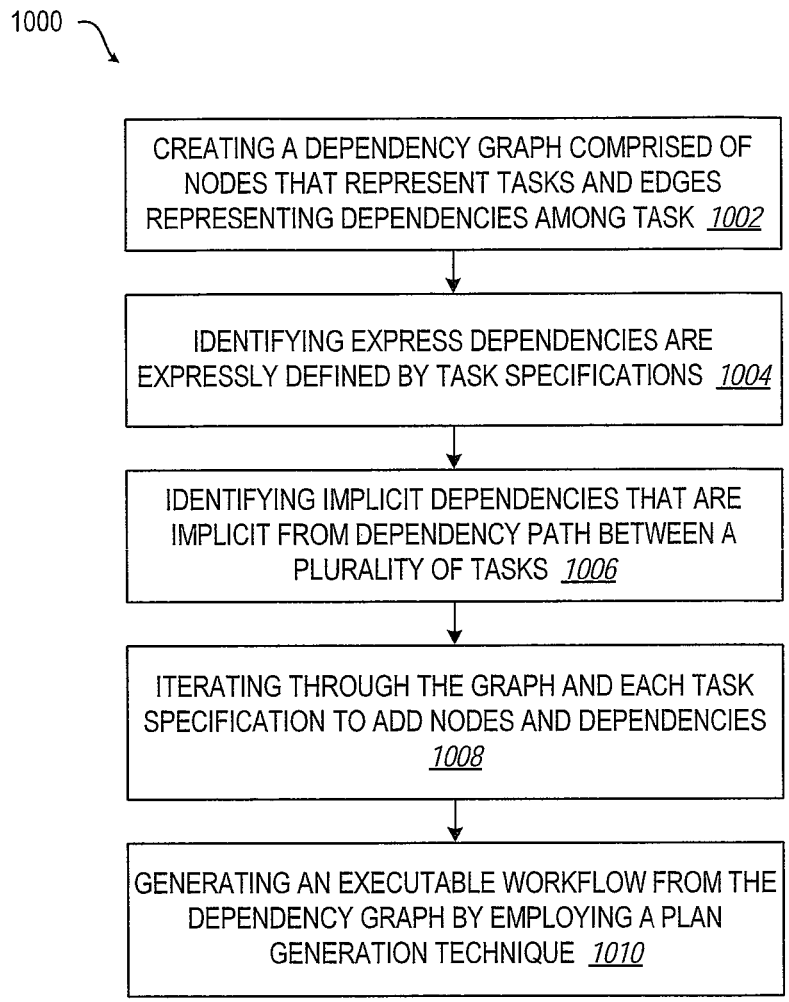
FIG. 10 depicts a flow diagram for constructing the configuration model during discovery of the target environment subsequent to referencing the product knowledge model for the methodology of FIG. 8, according to one or more embodiments.

In FIG. 10, a methodology 1000 is depicted for constructing the configuration model during discovery of the target environment subsequent to referencing the product knowledge model, such as discussed for block 814 of FIG. 8. A dependency graph is created comprised of nodes that represent tasks and edges representing dependencies among task (block 1002). Dependencies are identified that are expressly defined by task specifications (block 1004). Dependencies are also identified that are implicit from dependency path between a plurality of tasks (block 1006). Iteration is performed through the graph and each task specification to add nodes and dependencies (block 1008). An executable workflow is generated from the dependency graph by employing a plan generation technique (block 1010).

By virtue of the foregoing, a framework has been described for instantiating an application from disk snapshots from a different network environment to a virtualized environment. The disclosed approach comprises formally specifying the knowledge about product configurations, compiling the knowledge into a plan, and later, executing the plan on a set of machines constructed from disk snapshots. The plan is capable of discovering application configurations in an inconsistent configuration setup. A key feature of our framework is that knowledge is specified once per product and reused across any application that uses the product. Also, a knowledge provider need not be aware of the detailed contents of the knowledge provided by others.

The proposed approach does not require any existing configuration database. The proposed approach does not require direct access to production machines in migration scenario. The proposed approach does not require any special network setup such as private network. The proposed approach does not require instrumentation of software stack. A prototype has been implemented using this approach and evaluated on a real world telecommunications application. The evaluation demonstrates the feasibility of this approach for migration using disk snapshots. This approach does not require a special setup for network isolation and allows application level re-configurations.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present innovation is defined only by the appended claims.

As will be appreciated by one skilled in the art, aspects of the present innovation may be embodied as a system, method or computer program product. Accordingly, aspects of the present innovation may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present innovation may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present innovation may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present innovation are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present innovation may be implemented using any combination of software, firmware or hardware. As a preparatory step to practicing the innovation in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the innovation may be practiced by combining one or more machine-readable storage devices containing the code according to the present innovation with appropriate processing hardware to execute the code contained therein. An apparatus for practicing the innovation could be one or more processing devices and storage systems containing or having network access to program(s) coded in accordance with the invention.

Thus, it is important that while an illustrative embodiment of the present innovation is described in the context of a fully functional computer (server) system with installed (or executed) software, those skilled in the art will appreciate that the software aspects of an illustrative embodiment of the present innovation are capable of being distributed as a program product in a variety of forms, and that an illustrative embodiment of the present innovation applies equally regardless of the particular type of media used to actually carry out the distribution.

While the innovation has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the innovation without departing from the essential scope thereof. Therefore, it is intended that the innovation not be limited to the particular embodiments disclosed for carrying out this invention, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the invention. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A computer implemented method for instantiating disk snapshots from a different network environment to a virtualized environment, the method comprising:
   accessing a product knowledge model;
   accessing a disk snapshot of a composite application executing in a first environment as a plurality of virtual machines;
   migrating the disk snapshot to a second environment;
   discovering network configuration settings using the product knowledge model;
   constructing a configuration model based in part upon the discovered network configuration settings; and
   building the product knowledge model as a framework of a structural configuration meta-model of component types of selected configurations with knowledge specified on top of the framework as task specifications, each specification comprising actions selected from a group consisting of discovery, update, start and stop taken on a selected component type.

2. The computer implemented method of claim 1, wherein constructing the configuration model further comprises:
   creating a dependency graph comprised of nodes that represent tasks and edges representing dependencies among task either expressly defined by task specifications or an implicit dependency path between a plurality of tasks;
   iterating through the graph and each task specification to add nodes and dependencies; and
   generating an executable workflow from the dependency graph by employing a plan generation technique.

3. The computer implemented method of claim 1, further comprising preparing the disk image for migration by injecting a network script invoked during first network boot to update a network configuration and by copying an agent into the disk image to perform basic execution and file access tasks.

4. The computer implemented method of claim 3, wherein migrating the disk image to the second environment further comprises:
   booting the prepared disk snapshot in the second environment; and
   assigning network settings by having the injected network script read a virtual floppy disk to re-configure a network adapter,
   wherein booting the prepared disk snapshot starts the agent in each machine of the second environment.

5. The computer implemented method of claim 1, further comprising presenting a dynamic user interface to receive user configuration information for the configuration model.

6. The computer implemented method of claim 5, further comprising reconfiguring the application in the second environment based upon the user configuration information and starting the reconfigured application.

7. A computer program product for instantiating disk snapshots from a different network environment to a virtualized environment, the computer program product comprising:
a machine-readable storage device; and
program code embedded on the machine-readable storage device that when executed by a processor of a data processing system performs the following functions:
accessing a product knowledge model;
accessing a disk snapshot of a composite application executing in a first environment as a plurality of virtual machines;
migrating the disk snapshot to a second environment;
discovering network configuration settings using the product knowledge model;
constructing a configuration model based in part upon the discovered network configuration settings; and
building the product knowledge model as a framework of a structural configuration meta-model of component types of selected configurations with knowledge specified on top of the framework as task specifications, each specification comprising actions selected from a group consisting of discovery, update, start and stop taken on a selected component type.

8. The computer program product of claim 7, wherein program code further provides the functions of constructing the configuration model by:
creating a dependency graph comprised of nodes that represent tasks and edges representing dependencies among task either expressly defined by task specifications or an implicit dependency path between a plurality of tasks;
iterating through the graph and each task specification to add nodes and dependencies; and
generating an executable workflow from the dependency graph by employing a plan generation technique.

9. The computer program product of claim 7, wherein said program code provides the functions of preparing the disk image for migration by injecting a network script invoked during first network boot to update a network configuration and by copying an agent into the disk image to perform basic execution and file access tasks.

10. The computer program product of claim 9, wherein the program code provides the functions of migrating the disk image to the second environment by:
booting the prepared disk snapshot in the second environment; and
assigning network settings by having the injected network script read a virtual floppy disk to re-configure a network adapter,
wherein booting the prepared disk snapshot starts the agent in each machine of the second environment.

11. The computer program product of claim 7, wherein program code performs the function of presenting a dynamic user interface to receive user configuration information for the configuration model.

12. The computer program product of claim 11, wherein program code further performs the function of reconfiguring the application in the second environment based upon the user configuration information and starting the reconfigured application.

13. A system for instantiating disk snapshots from a different network environment to a virtualized environment, the system comprising:
a processor; and
a memory having code executing on the processor that configures the processor to:
access a product knowledge model;
access a disk snapshot of a composite application executing in a first environment as a plurality of virtual machines;
migrate the disk snapshot to a second environment;
discover network configuration settings using the product knowledge model;
construct a configuration model based in part upon the discovered network configuration settings; and
build the product knowledge model as a framework of a structural configuration meta-model of component types of selected configurations with knowledge specified on top of the framework as task specifications, each specification comprising actions selected from a group consisting of discovery, update, start and stop taken on a selected component type.

14. The system of claim 13, wherein the code for constructing the configuration model further comprises code that configures the processor to:
create a dependency graph comprised of nodes that represent tasks and edges representing dependencies among task either expressly defined by task specifications or an implicit dependency path between a plurality of tasks;
iterate through the graph and each task specification to add nodes and dependencies; and
generate an executable workflow from the dependency graph by employing a plan generation technique.

15. The system of claim 13, further comprising code that configures the processor to prepare the disk image for migration by injecting a network script invoked during first network boot to update a network configuration and by copying an agent into the disk image to perform basic execution and file access tasks.

16. The system of claim 15, wherein the code for migrating the disk image to the second environment further comprises code that configures the processor to:
boot the prepared disk snapshot in the second environment; and
assign network settings by having the injected network script read a virtual floppy disk to re-configure a network adapter;
wherein booting the prepared disk snapshot starts the agent in each machine of the second environment.

17. The system of claim 13, further comprising code that executes on the processor to configure the processor to:
present a dynamic user interface to receive user configuration information for the configuration model; and
reconfigure the application in the second environment based upon the user configuration information and for starting the reconfigured application.

* * * * *